United States Patent

Adler

[15] 3,678,401

[45] July 18, 1972

[54] SOLID-STATE TRAVELING-WAVE AMPLIFICATION SYSTEM

[72] Inventor: Robert Adler, Northfield, Ill.

[73] Assignee: Zenith Radio Corporation, Chicago, Ill.

[22] Filed: Oct. 5, 1970

[21] Appl. No.: 77,956

[52] U.S. Cl. ..............................330/5.5, 307/303, 307/304, 330/5, 330/35

[51] Int. Cl. ..........................................................H03f 3/16

[58] Field of Search ...............................................330/5.5, 5

[56] References Cited

UNITED STATES PATENTS 3,096,485 7/1963 Chang.......................................330/5

*Primary Examiner*—Roy Lake
*Assistant Examiner*—Darwin R. Hostetter
*Attorney*—John J. Pederson

[57] ABSTRACT

An input transducer launches acoustic surface waves along a piezoelectric propagating medium to an output transducer. An iterative series of solid-state amplifiers is disposed alongside the propagating medium. Associated with each amplifier is a signal delay device. A corresponding iterative series of electrodes, also spaced successively along the propagating medium, individually couple successive portions of that medium to respective ones of the amplifiers. Each electrode responds to wave energy in the medium for feeding an input signal to its associated amplifier and an adjacent electrode responds to the delayed output of that amplifier for producing a field in the medium that re-enforces the wave energy. The principle of operation extends at higher frequencies to the use of an electrical delay line with the electrodes, or simply conductors, individually tapped to respective different portions of that line. In any case, all of the different elements are deposited in solid-state form over the surface of a substrate, resulting in a completely integrated amplification system.

13 Claims, 5 Drawing Figures

Inventor
Robert Adler
By Francis W. Crotty
Attorney

Inventor
Robert Adler
By Francis W. Crotty
Attorney

SOLID-STATE TRAVELING-WAVE AMPLIFICATION SYSTEM

CROSS-REFERENCE TO RELATED APPLICATION

This application relates to but is in no way dependent upon a copending application Ser. No. 82,919, filed Oct. 22, 1970, assigned to the assignee of the present invention.

BACKGROUND OF THE INVENTION

The present invention pertains to solid-state amplification systems. More particularly, it relates to a solid-state system in which amplification is obtained by traveling-wave interaction.

Over the years, many different traveling-wave amplifiers have employed interaction between a physical structure, along which signal energy is propagated, and energy carried by and along an electron beam. One particular, and somewhat unconventional, approach was described in an article entitled "-Miniature Traveling-Wave Tube" by Robert Adler in *Electronics* for October 1951. As there disclosed, a broad stream of electrons is launched transversely across a low-velocity transmission line. Each longitudinal slice of the stream approaches the line at some point and is influenced or controlled by the signal voltage prevailing on the line at that instant. The control action in one version consists of electron deflection. After that initial interaction, each such slice then is allowed to drift for a definite time period after which it is directed to interact with the transmission line a second time, thereby re-enforcing a signal current therein. While this approach permits the construction of comparatively miniature traveling-wave tubes, they still require the somewhat inconvenient evacuated envelope together with the necessary beam focusing and controlling structures.

More recently, several different forms of solid-state devices have been suggested for obtaining traveling-wave interaction. In these devices, electrons are caused to drift in a semi-conductor material associated with a medium that propagates acoustic waves. By suitably selecting the relative velocities of the electrons and the acoustic waves, interaction between the two may result in amplification of the acoustic waves. The additional energy required to achieve the amplification is derived from the source of energy that effects movement of the electrons. Several different devices utilizing this general approach are described in U.S. Pat. No. 3,388,334 issued June 11, 1968, in the name of Robert Adler and assigned to the assignee of the present application. However, those and other somewhat similar devices have yet to find any significant degree of commercial utilization. At least in large part, this stems from difficulties of fabrication and the unavailability, at least at reasonable cost, of compatible materials that exhibit the correct numerical values of the desired properties.

SUMMARY OF THE INVENTION

It is, accordingly, a general object of the present invention to provide a solid-state amplification system which affords the advantages of solid-state construction present in the last-discussed devices while at the same time exhibiting the efficiency of operation and other advantages attendant to the operation of the earlier-described electron-stream traveling-wave amplifiers.

Another object of the present invention is to provide a solid-state traveling-wave amplification system which is capable of being fabricated with readily available materials and by use of present-day integrated-circuit manufacturing techniques.

A further object of the present invention is to provide a solid-state traveling-wave amplification system which exhibits unconditional stability in operation and, within reason, permits obtaining any desired degree of amplification.

A solid-state traveling-wave amplification system constructed in accordance with the present invention includes a delay line that propagates signal energy along a path with a predetermined phase velocity. A plurality of solid-state amplifiers are spaced successively alongside the delay line, each amplifier having its own input and output terminals. A similar plurality of taps are spaced successively along the delay line in the direction of signal energy flow. Each tap provides signal energy for individually feeding a signal to an associated one of the amplifiers. The amplifiers also are coupled individually to respective different ones of the taps adjacent to the taps from which the signal is fed. Finally, delay means in the signal energy path introduces a time delay of the signal through each amplifier and its coupling means that corresponds to the spatial delay of the signal propagating between each adjacent pair of the taps.

BRIEF DESCRIPTION OF THE DRAWINGS

The features of the present invention which are believed to be novel are set forth with particularity in the appended claims. The organization and manner of operation of the invention, together with further objects and advantages thereof, may best be understood by reference to the following description taken in connection with the accompanying drawings, in the several figures of which like reference numerals identify like elements and in which:

DESCRIPTION OF THE PREFERRED EMBODIMENT

Figure 1:
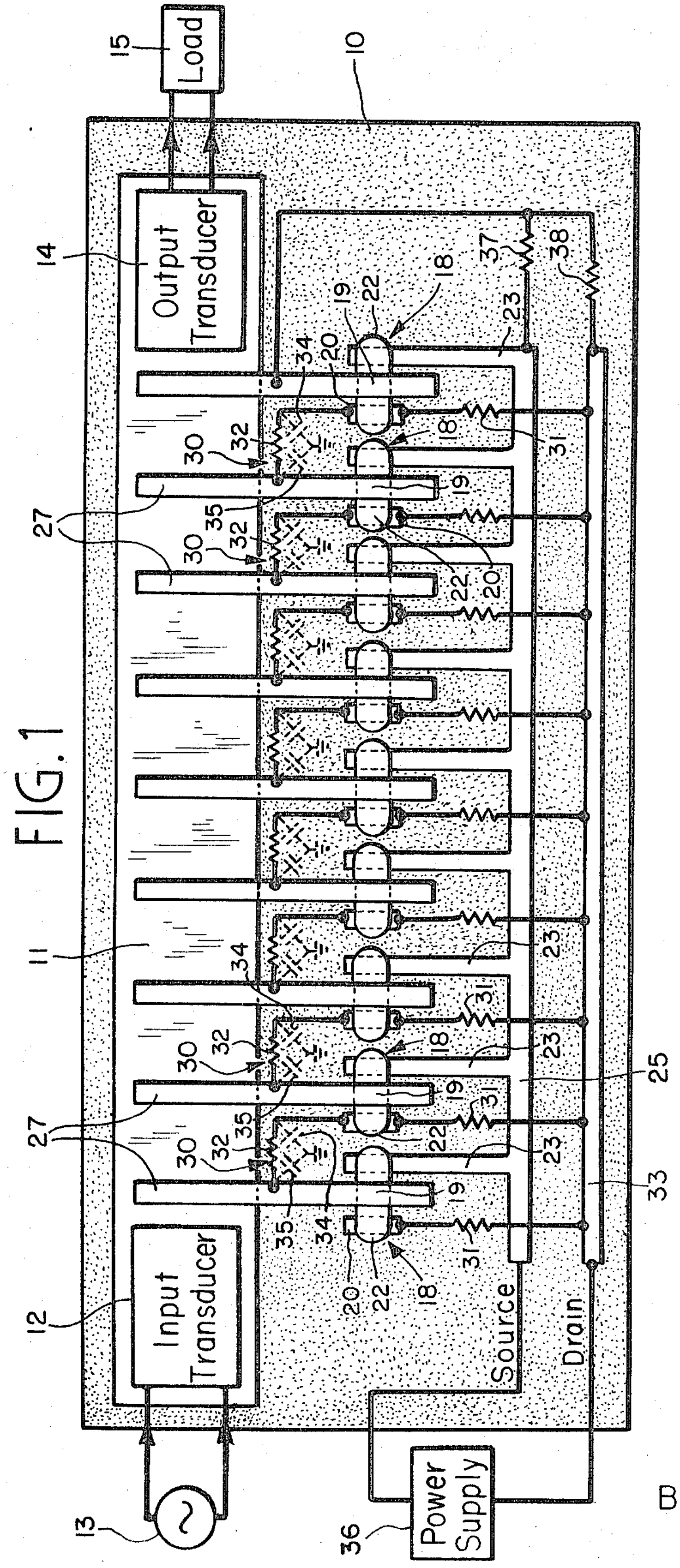
FIG. 1 is a partly schematic plan view of a solid-state traveling-wave amplification system.

In FIG. 1, a solid-state traveling-wave amplification system is deposited upon a substrate 10 which may be of an insulating material such as glass. Disposed lengthwise along the upper surface of the glass is a piezoelectric medium 11 of a material, such as PZT or lithium niobate, propagative of acoustic energy in the surface-wave mode. To that end, an input transducer 12 located near one end of medium 11 responds to an input signal from a source 13 to launch acoustic surface waves along the medium to an output transducer 14 disposed near the opposite end of medium 11 and across which is coupled a load 15.

Figure 2:
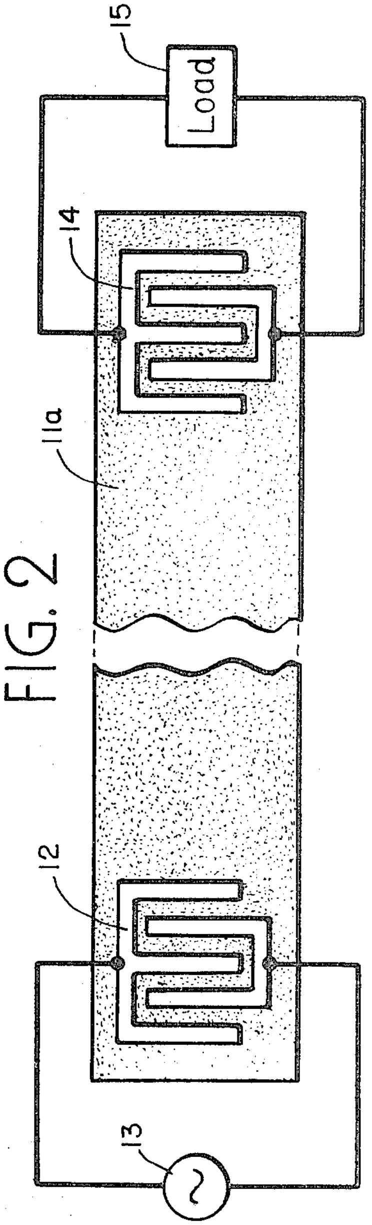
FIG. 2 is a partly schematic plan view of a portion of the system shown in FIG. 1.

While transducers 12 and 14 may take a number of different forms, one suitable variety is illustrated in FIG. 2 wherein input transducers 12 and 14 are disposed near opposite ends of a piezoelectric medium 11*a* that represents, for purposes of illustration, medium 11 of FIG. 1 detached from the other portions of the system shown in that figure. Thus, transducers 12 and 14 in this simple arrangement are identical and are each constructed of two conductive comb-type electrode arrays. The teeth of one comb are interleaved with the teeth of the other. The combs are of a material, such as gold or aluminum, which may be vacuum deposited on a smoothly lapped and polished planar surface of piezoelectric body 11*a*. The distance between the centers of two consecutive teeth in each array in one-half of the acoustic wavelength in the piezoelectric material of the signal wave for which it is desired to achieve maximum response.

Direct piezoelectric surface-wave transduction is accomplished by the spatially periodic interdigital electrodes or teeth of transducer 12. A periodic electric field is produced when a signal from source 13 is applied to the teeth and, through piezoelectric coupling, the electric signal is transduced to a traveling acoustic surface wave on substrate 11*a*. This occurs when the stress components produced by the electric field in the substrate are substantially matched to the stress components associated with the surface-wave mode. Those surface waves are transmitted along the substrate to output transducer 14 where they are converted to an electric signal for application to load 15. The operation of surface wave devices of this kind is now well known. Further modifications and adjustments for the purpose of particularly shaping the response presented by the device to the transmitted signal are described in copending application Ser. No. 721,038, filed Apr. 12, 1968, now U.S. Pat. No. 3,582,838, and assigned to the same assignee as the present application.

Returning again to FIG. 1, spaced successively alongside propagating medium 11 are a plurality of solid-state amplifiers 18. Each amplifier includes an input terminal 19 and an output terminal 20. While amplifiers 18 may be selected from among a variety of solid-state devices, such as transistors of the bipolar or MOS type, as illustrated each takes the form of a thin-film field-effect transistor. Each thus includes a semiconductor film 22 disposed above a previously deposited source electrode 23 and an output electrode 20 that serves as a drain. Source electrodes 23 are connected in common by a conductive strip 25 which may be deposited upon substrate 10 simultaneously with the formation of individual electrodes 23 and 20. Each semiconductor film 22 in the iterative series of amplifiers 18 thus bridges its associated source electrode 23 and drain electrode 20. A thin insulating layer (not shown) is disposed between each semiconductor film 22 and its input terminal 19.

Each input terminal 19 takes the form of an elongated conductive electrode, one end portion of which overlies its associated semiconductor film 22 and the overlying insulating layer so as to serve as the gate of the resulting field-effect transistor. The opposite end portion 27 of each of these conductive strips is electrically coupled to the wave propagation surface of medium 11 where it forms, together with the medium, an individual transducer in the same way that each tooth in the electrode combs of FIG. 2 forms an elemental transducer. That is, each of electrode portions 27 may respond to acoustic waves in medium 11 to develop an electric signal and, conversely, each such portion acts in response to an electric signal thereon to induce acoustic wave energy in medium 11.

Also disposed in an iterative series along the length of substrate 10 are a plurality of signal delay devices 30 each coupled between an output or drain electrode 20 and the next preceding gate electrode 19. More particularly, each delay device 30 is a network physically formed by depositing a pair of resistors 31 and 32. Resistors 32 each connect between the corresponding output electrode 20 and next preceding electrode 27, while each resistor 31 connects between that drain electrode 20 and a conductive ribbon 33 which forms a common drain supply terminal. Each associated pair of resistors 31 and 32, together with the stray capacitances of the associated drain and gate electrodes, respectively represented in dashed-line form by capacitors 34 and 35, constitutes a two-section phase delay network. Completing the overall assembly, the first drain electrode 20 at the left side of FIG. 1 is returned to conductor 33 by its terminating resistor 31, and a direct-current power supply 36 is connnected between source electrode 25 and drain electrode 33 to energize all of amplifiers 18 for operation. As will become apparent, the end transistors in FIG. 1 do not produce useful signal amplification but they serve to insure uniformity. To maintain conduction in the right-most transistor, its gate 19 is connected to the junction between resistors 37 and 38 that form a voltage divider between source and drain terminals 25 and 33.

The different interconnections are such that the respective iterative series of amplifiers 18 and delay devices 30 are cross-coupled with electrodes 19 and 27, so that essentially each electrode responds to wave energy in medium 11 for feeding an input signal to its particularly associated amplifier while an immediately preceding electrode 19, 27 responds to the output of that amplifier for producing a field that re-enforces the wave energy. The time delay of the signals through each amplifier 18 and its coupling means corresponds to the spatial delay of the acoustic waves propagating between the corresponding adjacent pair of electrode portions 27. In more detail, electrode portions 27 preferably have a center-to-center spacing of one-fourth acoustic wavelength in medium 11 at the center frequency $f_o$ of the input signal from source 13. The time delay presented to the signals in each of devices 30 is also equal to one-fourth cycle at the center frequency $f_o$. Added to these delays, or phase shifts, is the 180° phase shift normally encountered in the action of each amplifier 18. Thus, each signal fed back through an amplifier 18 is so timed that it serves to re-enforce the acoustic wave energy propagating from left to right in substrate 11.

To illustrate this amplification process, assume that, at a given instant, a positive potential peak passes a certain one of electrodes 27, inducing a positive voltage in the corresponding gate portion 19. Transistor action causes an increased flow of current between source and drain, thus causing the potential of the associated drain electrode 20 to change toward negative. The associated delay network 30 transmits this voltage change back to the preceding electrode 27, where it arrives one-quarter cycle later. Meanwhile, the wave on device 11 has traveled forward one-quarter wavelength; the positive potential peak which gave rise to the process described is now one-quarter wavelength to the right of the electrode 27 where the process started, and the next negative potential peak is just arriving at a point one-quarter wavelength to the left, exactly at the preceding electrode 27. Thus, the negative-going output meets a negative potential peak and reinforces it.

Figure 4:
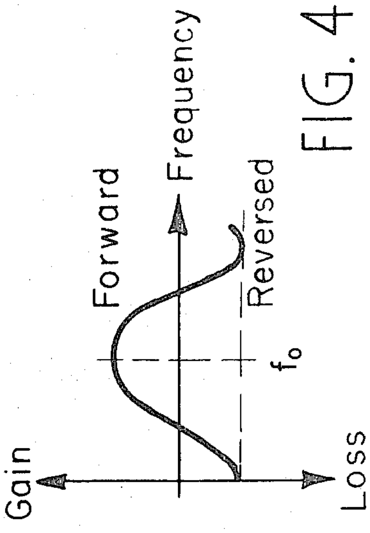
FIG. 4 is a plot illustrating operational characteristics of the systems of FIGS. 1 and 3.

Full reinforcement, and thus maximum gain, is possible only at the frequency $f_o$ where the phase shift encountered by the signal in passing through the transistor and phase shifting network, together with the spatial phase shift between adjacent electrodes 27, adds up to 360° or 0°. Because the phase shift encountered in the phase shifting network, as well as the spatial phase shift between adjacent electrodes, are at least approximately proportional to frequency, the gain varies with frequency as shown in the curve labeled "Forward" in FIG. 4. At very low frequencies, the two phase shifts are negligible but the action of the transistor still reverses the phase of its input signal; the negative-going output produced by a passing positive potential peak acts back on the same, unshifted positive peak, producing negative feedback and loss.

Phase conditions for a wave traveling in the reverse direction, from right to left, along substrate 11 remain the same at all frequencies. Because the two phase shifts, by design, are equal to 90° at a common frequency $f_o$ and remain at least approximately equal to each other at other frequencies, the spatial phase shift between adjacent electrodes 27 is canceled out by the phase shifting network in the signal path; negative feedback is thus produced at all frequencies, leading to the behavior shown by the dashed line labeled "Reversed" in FIG. 4.

The particular amplification approach illustrated may be likened to a succession of boot-strap operations that produce gain in but one direction, while only attenuation is effected in the opposite direction. Under these conditions, the system is assured the attainment of unidirectional gain with unconditional stability. Medium 11 constitutes a transmission line. It is a characteristic of the illustrative materials employed that the impedances of the input and output terminals of each amplifier, including the delay devices, are high compared to the acoustic transmission line impedance.

In the system of FIG. 1, electrodes 27 are integral with gate electrodes 19, and each drain feeds signal energy through the delay device to the adjacent electrode 27. In the similarly appearing system of FIG. 3, the same overall operational approach is utilized while the individual principal components are arranged in a different sequence. In this case, each electrode 27 is in common with a respective drain electrode 20, while the feedback signal energy is fed through a delay device 30' to the next preceding gate electrode 19. In this version, then, the delay device is included in the feedback path ahead of its associated amplifier 18, just the reverse of the arrangement of FIG. 1.

Figure 3:
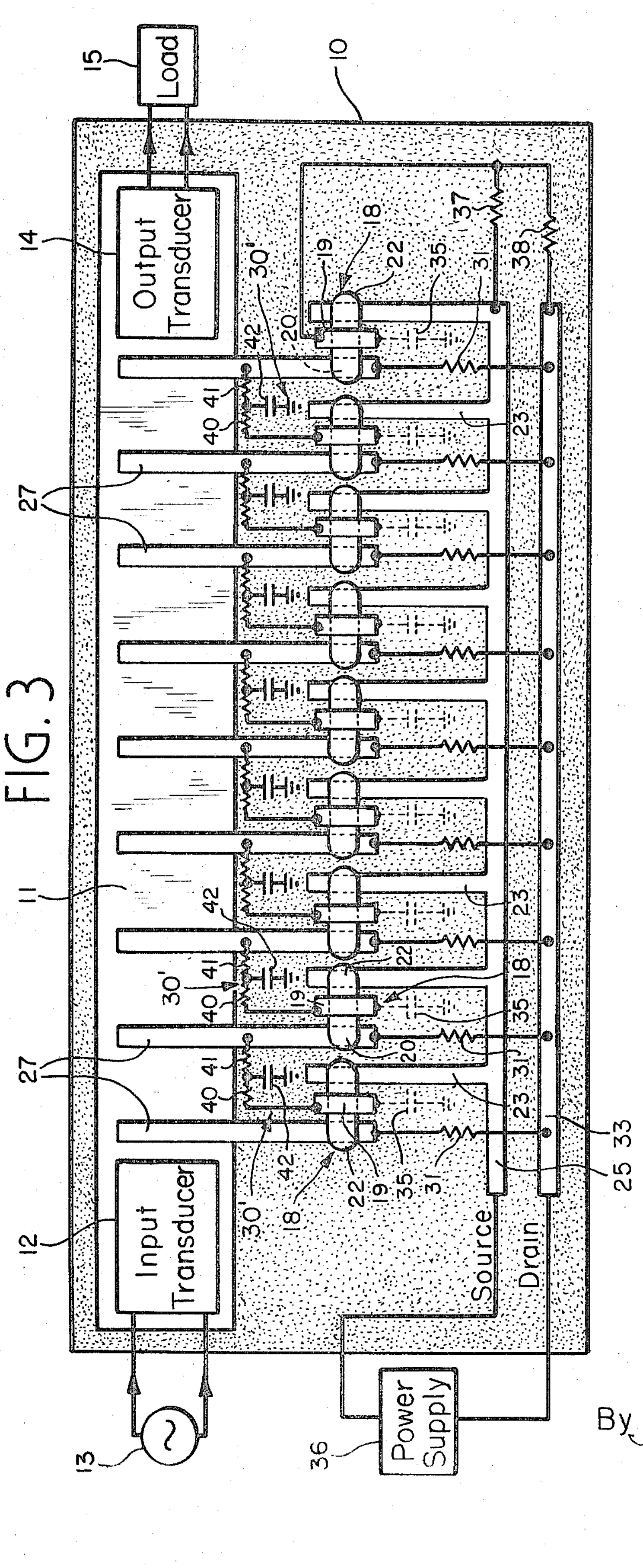
FIG. 3 is a partly schematic plan view of an alternative solid-state traveling-wave amplification system.

As shown in FIG. 3, each delay device 30' includes the series combination of a pair of resistors 40 and 41 together with a discrete capacitor 42 shunted from the junction between resistors 40 and 41 to ground. The gate capacitance is again represented in dashed line by a capacitor 35 extending between each gate and ground. Stray drain capacitance, represented by dashed-line capacitor 34 in FIG. 1, also exists in the arrangement of FIG. 3 but is not illustrated for the purpose of clarity.

Otherwise, the operation of the system of FIG. 3 is the same as that already described for the system of FIG. 1. The FIG. 3 arrangement is advantageous because each gate 19 exhibits essentially a pure capacitance, permitting the attainment of a given phase delay with less attenuation than is the case when there also is a large conductance component present across the output port of a resistance-capacity low pass filter. Consequently, the FIG. 3 version minimizes loading of the wave transmission line.

It is also to be noted that the arrangements of FIGS. 1 and 3 may be combined. That is, electrodes 27 may be separated from gate as well as drain electrodes by delay elements or delay networks each of which provides a portion of the total desired delay in the signal path. Furthermore, it is well known that the phase reversal in a transistor is not an exact 180° at high frequencies; there is a delay resulting from the finite speed at which charge carriers can move. This delay must be taken into account in designing delay networks 30, 30' or combinations thereof. It is also to be understood that, while discrete capacitor and resistor networks have been depicted, distributed networks, made up purposefully of the combinations of stray capacitances and effectively distributed resistances, are preferred.

In laying out the different components of the systems of both FIGS. 1 and 3, attention has been given to the avoidance of undesired interelectrode capacitance wherever possible. This is the reason for connecting source electrodes 23 in common with conductive strip 25 along one side of amplifiers 18, while electrodes 27 and the delay devices are formed along the other side of the amplifiers. Consequently, it is only necessary that the drain supply leads from resistors 31 cross the source supply represented by strip 25. In both of the illustrated systems, it will be observed that the direct-current gate potential equals the drain potential because the gate electrode draws no current. It may be noted, in passing, that gate electrodes 19 may be connected, through respective individual resistors, to a common source of direct-current potential in order to modify the direct-current gate potential where desired.

It is further to be observed that useful gain is obtained within the amplifying systems of FIGS. 1 and 3 utilizing for amplifiers 18 elements which, when used in conventional circuits with resistance loads, might yield less than unity gain at the signal frequency. This advantage stems from the fact that the transmission line conserves the power applied to its input. Consequently, every increment of gain, however small, contributes to amplification. This permits the use of the illustrated thin-film amplifier elements which, at least at the present time, are not characterized as being particularly efficient for very-high-frequency amplification.

On the other hand, it is contemplated in the alternative to utilize other forms of amplifiers 18. As is well known, some types of amplifiers, such as certain integrated-circuit combinations of transistors, do not invert polarity, that is, effect a 180° phase shift of the signal being translated. When using that type of amplifier, it is necessary to rearrange the interconnections in order to obtain the desired reinforcement of the traveling acoustic waves. Specifically in that case, the output from each amplifier 18 is then coupled to the next succeeding, rather than preceding, electrode 27. In operation, the phase delay of the amplified signal at the center frequency $f_o$ corresponds to the spatial delay of the acoustic signal. While it would seem to complicate the physical arrangement, one may also note the possibility of coupling any given amplifier to other than an immediately adjacent electrode 27. In any case, the phase change of the electrically amplified signal is "matched" to the phase change of the propagating signal at the point of reinforcement.

As particularly embodied herein, the acoustic transmission lines are especially suitable for utilization in conventional television intermediate-frequency amplification. The typical 40 megahertz intermediate-frequency results in element spacings that are compatible with present-day microcircuit techniques. At microwave frequencies, on the other hand, the interelectrode spacings become minute. However, it is contemplated at those higher frequencies to employ an electrical transmission line, again simply deposited on a flat substrate alongside the amplifiers and delay devices. In that approach, sufficient transmission line length may be obtained by depositing the conductive line in a zig-zag formation. At such higher frequencies, amplifiers 18 desirably are of the bipolar or MOS type transistor fabricated on a single-crystal substrate of a material such as silicon or germanium.

In any event, a particular advantage of the described amplification systems arises from their fabrication entirely in solid-state form and by the use of present-day conventional deposition techniques. As shown, most of the different elements are deposited in direct electrical contact with their substrate. Of course, the input terminal portions 19 of the gate electrodes are electrically separated from the associated semiconductor film by an insulating layer, and the leads connecting resistors 31 to ribbon 33 are insulated from strip 25. It is in principle feasible to form substrate 10 of a material which in itself may also serve the function of wave-propagation medium 11; in general, however, it is believed desirable to include medium 11 as a separate element.

Figure 5:
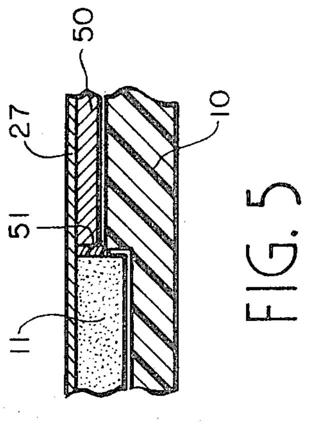
FIG. 5 is a fragmentary cross-sectional view illustrating one manner of fabricating a portion of the embodiments of FIGS. 1 and 3.

The latter preference may lead to difficulties of fabrication when utilizing evaporation or photoetching techniques. To obviate such difficulties, substrate 10 may include a step as shown in FIG. 5 so as to provide a continuous level upper surface on which to deposit electrodes 27. Piezoelectric medium 11 is disposed as close as possible to a chip 50 of silicon or other semiconductor material on which the amplifiers are formed. The inevitable gap is filled with a cement 51 so as to leave a continuous surface upon which electrode 27 subsequently is deposited. Alternatively, separate portions of electrode 27 are formed respectively on the upper surfaces of medium 11 and chip 50, following which the adjacent ends of those electrode portions are soldered together.

While particular embodiments of the present invention have been shown or described, it will be obvious to those skilled in the art that changes and modifications may be made without departing from the invention in its broader aspects. Accordingly, the aim in the appended claims is to cover all such changes and modifications as fall within the true spirit and scope of the invention.

I claim:

1. A solid-state traveling-wave amplification system comprising a piezoelectric medium propagative of acoustic waves;

- means responsive to an input signal for launching acoustic waves along said medium;
- means responsive to said acoustic waves for developing an output signal;
- an iterative series of electrodes spaced successively along said medium in the direction of acoustic wave travel;
- an iterative series of solid-state amplifiers spaced successively alongside said medium; and
- an iterative series of signal delay devices, said amplifiers and delay devices being cross-coupled with said electrodes so that each electrode in said series responds to a wave for feeding an input signal to a particular amplifier and an adjacent electrode responds to the output of that amplifier for producing a field that re-enforces the wave energy.

2. A solid-state traveling-wave amplification system comprising:

- a solid-state delay line propagative of signal energy along a path with a predetermined phase velocity;
- a plurality of solid-state amplifiers spaced successively alongside said delay line;
- a plurality of taps spaced successively along said delay line in the direction of signal energy flow, individually coupled to an assigned one of said amplifiers and responsive to said signal energy for individually feeding signals to its assigned one of said amplifiers;

and signal delay means coupling each of said amplifiers to different ones of said taps adjacent to the respective one of the taps from which the signal is fed to that amplifier, the time delay of said signals through each amplifier and its coupling means corresponding to the spatial delay of said signal energy propagating between each adjacent pair of said taps.

3. A solid-state traveling-wave amplification system comprising:

a piezoelectric medium propagative of acoustic waves;

means responsive to an input signal for launching acoustic waves along said medium;

means responsive to said acoustic waves for developing an output signal;

a plurality of solid-state amplifiers spaced successively alongside said medium;

a plurality of electrodes individually coupled to an assigned one of said amplifiers, spaced successively along said medium in the direction of acoustic wave travel and constituting therewith elemental acoustic-wave transducers responsive to said acoustic waves for individually feeding a signal to its assigned one of said amplifiers, said amplifiers, in turn, being coupled to respective ones of said electrodes adjacent to the ones of said electrodes from which the signal is fed to that amplifier;

and signal delay means included in the coupling of said amplifiers to said respective ones of said electrodes, the time delay of said signal through each amplifier and its coupling means corresponding to the spatial delay of said acoustic waves propagating between the corresponding adjacent pair of said electrodes.

4. An amplification system as defined in claim 3 in which said medium, said amplifiers and said delay means are all disposed on a substrate.

5. An amplification system as defined in claim 3 in which said amplifiers are thin-film transistors having common source electrodes.

6. An amplification system as defined in claim 3 in which said amplifiers are field-effect transistors and in which a portion of the one of said electrodes coupled to any one of said amplifiers constitutes a gate for its transistor.

7. An amplification system as defined in claim 3 in which said amplifiers are field-effect transistors and in which a portion of the one of said electrodes coupled to any one of said amplifiers constitutes a drain for its transistor.

8. An amplification system as defined in claim 3 in which each output terminal is effectively coupled individually through a first resistive element to the next preceding amplifier and through a second resistive element to a common potential source, the capacitances presented by said input and output terminals together with said resistive elements forming the associated delay means.

9. An amplification system as defined in claim 3 in which said electrodes are spaced successively apart by a distance of at least substantially one-fourth acoustic wavelength in said medium at the frequency of said signal and in which the time delay in each of said delay means is substantially one-fourth cycle at said frequency.

10. An amplification system as defined in claim 3 in which the impedances presented by said input and output terminals are high compared to the impedance presented to said electrodes by said medium.

11. An amplification system as defined in claim 3 in which each of said amplifiers has input and output terminals and in which each of said electrodes is connected to the input terminal of its respective amplifier while the output terminal thereof is coupled through said signal delay means to an adjacent electrode.

12. An amplification system as defined in claim 3 in which each of said amplifiers has input and output terminals and in which each of said electrodes is connected to an output terminal of its respective amplifier while the input terminal thereof is coupled through said signal delay means to an adjacent electrode.

13. An amplification system as defined in claim 3 in which said amplifiers comprise bipolar or MOS transistors on a common semiconductor substrate.

* * * * *